3,079,423
PROCESS FOR THE PREPARATION OF
CYANOACETYLENES
Joseph L. Comp, Hitchcock, Tex., assignor to Monsanto Chemical Company, St. Louis, Mo., a corporation of Delaware
No Drawing. Filed Sept. 14, 1960, Ser. No. 55,846
7 Claims. (Cl. 260—465.3)

The present invention relates to a new method for the preparation of cyanoacetylenes or acetylenic nitriles.

Cyanoacetylenes, chemical compounds useful in diverse ways as intermediates and particularly as cyanovinylating agents in the production of cyanovinyl monomers, have not heretofore been readily obtainable from acetylene hydrocarbons. The general method for their preparation has involved conversion of the particular acetylenic acid precursor to the corresponding amide followed by dehydration of the latter with phosphorus pentoxide. It has now been discovered that these interesting and highly reactive compounds can be prepared in a relatively simple manner directly from acetylene hydrocarbons.

According to the invention, a mixture of cyanogen and an acetylene hydrocarbon of the formula $$R—C \equiv C—H$$

wherein R may be hydrogen or an alkyl, alkenyl, alkynyl, aryl, aralkyl, or alkaryl radical are reacted at a temperature within the range from 500° C. to 1000° C. In a preferred embodiment of the process, a diluent gas is fed with the reactants to minimize secondary reactions of acetylene such as polymerization, cracking, etc., but the use of such a diluent is optional and not required. Any non-reactive gas such as argon, nitrogen, carbon dioxide or the like is suitable for such purpose.

The invention is illustrated in the following examples which, however, are not to be construed as limiting it in any manner whatsoever.

*Example 1*

An empty quartz tube about 1 in. in diameter and 30 in. long with an effective volume of about 90 cc. was employed as the reactor. The tube was heated over a section about 11–12 inches long and beginning at a point about 6 in. down from the top by means of nichrome resistance wire wrapped around the outside and covered by the necessary insulation. Reaction temperature was recorded by means of an iron-constantan thermocouple inserted in the middle of the reactor. Cyanogen and acetylene in a mole ratio of 7:1 were fed, respectively, from cylinders through rotameters into a cyclone mixer where they were thoroughly mixed. The mixed gases were then passed into the top of the reactor and through the heated section maintained at a temperature of 840° C. Reaction time was approximately 1.0 second. The effluent gas was collected in a bomb connected to the outlet of the reactor and analyzed by mass spectrometer. Approximately 8.8 mole percent of the gas sample collected was found to be cyanoacetylene.

*Example 2*

A series of experiments were made at various reaction conditions in the reactor described in Example 1 using the procedure outlined in that example with either argon or nitrogen being charged as a diluent gas along with the acetylene and cyanogen fed. Conditions and results of these runs are tabulated below.

| Run No. | Temp. (° C.) | Reaction time (sec.) | Ratio $(CN)_2/C_2H_2$ | Diluent, mole percent total feed | Percent Conv. of $C_2H_2$ to CNA* | Percent yield CNA* on $C_2H_2$ |
|---|---|---|---|---|---|---|
| 14 | 800 | 3.5 | 5.0 | 60 | 4.7 | |
| 61 | 750 | 2.0 | 4.5 | 50.9 | 9.7 | 45 |
| 41 | 800 | 2.5 | 8.5 | 68.2 | 41.5 | 42 |
| 69 | 830 | 1.7 | 5.7 | 54.8 | 40.4 | 54 |
| 71 | 841 | 0.96 | 6.9 | 66.3 | 45.7 | 95 |
| 73 | 825 | 1.9 | 8.4 | 44.8 | 41.6 | 47 |
| 75 | 829 | 1.9 | 8.0 | 48.3 | 43.8 | 52 |
| 81 | 934 | 2.4 | 8.1 | 44.9 | 2.6 | 3 |

*Cyanoacetylene.

*Example 3*

Using the same reactor and following the same procedure described in Example 1, a gaseous mixture of cyanogen and methylacetylene in a mole ratio of 7:1 diluted with an amount of argon equal to about 60 mole percent of the total gas feed was passed through the reactor heated to a temperature of 650° C. at a rate to give a reaction time of about one second. Mass spectrometric analysis of the effluent gas established that cyanomethylacetylene was produced by this reaction.

*Example 4*

Two runs following the procedure and using the equipment of Example I were made in which cyanogen was reacted with monovinylacetylene. In both runs, the mole ratio of cyanogen to monovinylacetylene was 7.0, approximately 60 mole percent of the total gas feed was argon, and the reaction time was one second. Two different temperatures were employed: 600° C. and 630° C. Cyanomonovinylacetylene was positively identified as a reaction product in the effluent from both runs by means of mass spectrometric analysis.

*Example 5*

Mixtures of cyanogen, phenylacetylene, and argon in which the ratio of cyanogen to phenylacetylene was 7.0 and the amount of argon was 60 mole percent of the total mixture were reacted according to the manner of Example 1 for a reaction time of approximately 0.8 sec. at three different temperatures, 760° C., 810° C., and 870° C. Cyanophenylacetylene was produced at each temperature as evidenced by the composition of the effluent gas from the reactor in each run analyzed by means of a mass spectrometer. Three times the amount of cyanophenylacetylene was obtained at the highest temperature than at the lowest one employed.

The invention is not restricted to those acetylenes exemplified but includes within its scope any acetylene of the formula $$R—C \equiv C—H$$

wherein R may be hydrogen or an alkyl, alkenyl, alkynyl, aryl, alkaryl or aralkyl radical having up to 12 carbon atoms. Examples of such compounds in addition to those already mentioned are, for instance, ethylacetylene, propylacetylene, butylacetylene, allylacetylene, o-, m-, and p-tolylacetylene, o-, m-, and p-xylylacetylene, benzylacetylene, phenylethylacetylene, diacetylene, diphenylethylacetylene, phenylpropylacetylene and the like.

Variations from the conditions given in the examples may be made without departing from the scope of the invention. Pressure is not a critical variable being limited only by the stability of the reactants and products. Atmospheric pressure as exemplified, subatmospheric pressures, or superatmospheric pressures can be used. Any temperature from 500° C. to about 1000° C. can be employed. Reaction time, i.e., the length of time during which the reactant gases remain in the heated reaction zone, can be anywhere from 0.1 second to about 10 seconds. The reactant ratio of cyanogen to the acetylene hydrocarbon can be the stoichiometric one of 1:1 or any ratio between this and 20:1. When cyanogen itself is employed as a diluent, and this may be easily done, the ratio of cyanogen to acetylene hydrocarbon may be as high as 100:1 or higher. The mole fraction of diluent added can vary from 0–99% of the reaction mixture.

It is difficult to specify those conditions of reaction time, temperature, reactant ratio and mole fraction of diluent which will give optimum conversion of the acetylene hydrocarbon to the correspond cyanoacetylene because of the interdependence of the above-mentioned major variables in the reaction upon each other. However, optimum conditions can be readily determined by conducting a series of statistically designed experiments within the scope of the conditions set forth above and treating the data obtained to derive a series of simultaneous equations which delimit the conditions under which maximum conversion can be obtained. To illustrate how this can be done, such a series of experiments, some 80-odd in number, were made in the reaction of acetylene and cyanogen to obtain cyanoacetylene wherein all the major variables were studied at different levels in a statistically designed pattern. The data obtained were treated or analyzed according to the method described in the following publications: (1) G. E. P. Box and K. P. Wilson, "On the Experimental Attainment of Optimum Conditions," J. Roy Stat. Soc., Series B 1–45 (1951) and (2) Box, G.E.P., "The Exploration and Exploitation of Response Surfaces," Biometrics, vol. 10, 16–61 (1954).

Maximum or near maximum conversion of acetylene to cyanoacetylene (40 to 45%) may be obtained within the range of conditions that simultaneously satisfy the four equations shown below. In these, for the sake of convenience, $Z_1$=Temperature—° C.
$Z_2$=Contact time—in seconds
$Z_3$=Percent diluent in the feed gas stream
$Z_4$=Molar ratio of cyanogen to acetylene (1) $0 = 0.019715 Z_1 - 0.01268 Z_2 - 0.014011 Z_3 + 0.09271 Z_4 - 15.91103$
(2) $0 = 0.001316 Z_1 + 0.01928 Z_2 + 0.08294 Z_3 + 0.55459 Z_4 - 10.48580$
(3) $X_3 = -0.0019178 Z_1 + 1.70254 Z_2 + 0.027606 Z_3 - 0.43790 Z_4 - 6.32154$
(4) $X_4 = -0.0025754 Z_1 + 1.0499 Z_2 - 0.046384 Z_3 + 0.70193 Z_4 - 3.27377$ Since these equations are based on the experimental data, they are not expected to give exact answers because of the influence that the experimental error has on the selection of the constants. However, they can be expected to give answers reasonably close to the true answers, so long as one does not permit $(X_3^2 + X_4^2) > 4.0$. To use these equations, one may proceed by two routes. For example, one might let $X_3 = X_4 = 0$. In this case, $Z_1 = 814.6°$ C.
$Z_2 = 2.527$ sec.
$Z_3 = 60.35\%$
$Z_4 = 7.861$ Alternately, one might let $Z_1 = 820$, and $Z_2 = 2.00$, then substituting in Equations 1 and 2 solve for $Z_3$ and $Z_4$. In this case, the following two equations are obtained:

$15.91103 - 0.019715(820) + 0.01268(2.0)$
$\qquad = -0.014011 Z_3 + 0.09271 Z_4$
$10.48580 - 0.001316(820) - 0.01928(2.0)$
$\qquad = 0.08294 Z_3 + 0.55459 Z_4$ The values of $Z_3$ and $Z_4$ satisfying these two equations are:

$Z_3 = 64.43$
$Z_4 = 7.256$

At these conditions, $X_3 = -2.742$ and $X_4 = 1.1811$

While this is outside the limits prescribed by the inequality $X_3^2 + X_4^2 \leq 4$, the procedure for determining alternate conditions is nevertheless demonstrated.

This application is a continuation-in-part of my copending application Serial No. 7 filed January 4, 1960, now abandoned.

What is claimed is:

1. The process for producing cyanoacetylenes which comprises reacting an acetylene hydrocarbon of the formula $$R—C \equiv C—H$$

wherein R is a member of the group consisting of hydrogen and alkyl, alkenyl, alkynyl, aryl, aralkyl and alkaryl radicals having up to 12 carbon atoms with cyanogen at a temperature in the range from about 500° C. to about 1000° C. for a period of time from about 0.1 to about 10 seconds.

2. The process of claim 1 wherein the acetylene hydrocarbon is diluted with a gas which is inert under the reaction conditions in an amount up to about 99 mole percent of the acetylene hydrocarbon charged.

3. The process of claim 1 wherein the ratio of cyanogen to acetylene hydrocarbon is in the range from about 1:1 to about 20:1.

4. The process for producing cyanoacetylene which comprises passing a mixture of cyanogen and acetylene in a mole ratio within the range from about 1:1 to about 20:1, said acetylene being diluted with an inert gas in an amount up to about 99 mole percent of the acetylene charged, through an empty tube maintained at a temperature from about 500° C. to about 1000° C. at a rate such that the gas mixture is maintained at reaction temperature for a period from about 0.1 to about 10 seconds.

5. The process for producing cyanomethylacetylene which comprises passing a mixture of cyanogen and methylacetylene in a mole ratio within the range from about 1:1 to about 20:1, said methylacetylene being diluted with an inert gas in an amount up to about 99 mole percent of the acetylene charged, through an empty tube maintained at a temperature from about 500° C. to about 1000° C. at a rate such that the gas mixture is maintained at reaction temperature for a period from about 0.1 to about 10 seconds.

6. The process for producing cyanovinylacetylene which comprises passing a mixture of cyanogen and monovinylacetylene in a mole ratio within the range from about 1:1 to about 20:1, said monovinylacetylene being diluted with an inert gas in an amount up to about 99 mole percent of the acetylene charged, through an empty tube maintained at a temperature from about 500° C. to about 1000° C. at a rate such that the gas mixture is maintained at reaction temperature for a period from about 0.1 to about 10 seconds.

7. The process for producing cyanophenylacetylene which comprises passing a mixture of cyanogen and phenylacetylene in a mole ratio within the range from about 1:1 to about 20:1, said phenylacetylene being diluted with an inert gas in an amount up to about 99 mole percent of the acetylene charged, through an empty tube maintained at a temperature from about 500° C. to about 1000° C. at a rate such that the gas mixture is maintained at reaction temperature for a period from about 0.1 to about 10 seconds.

References Cited in the file of this patent

UNITED STATES PATENTS 2,803,642    Fierce et al. _____ Aug. 20, 1957